United States Patent
Roubicek et al.

(10) Patent No.: US 10,569,352 B2
(45) Date of Patent: Feb. 25, 2020

(54) MACHINE CUTTING TORCH SYSTEM

(71) Applicant: GCE HOLDING AB, Malmö (SE)

(72) Inventors: Martin Roubicek, Brandysek (CZ); Jiri Polivka, Chotebor (CZ); Gareth Pemberton, Worcestershire (GB)

(73) Assignee: GCE HOLDING AB, Malmö (SE)

( * ) Notice: Subject to any disclaimer, the term of this patent is extended or adjusted under 35 U.S.C. 154(b) by 142 days.

(21) Appl. No.: 15/318,934

(22) PCT Filed: Jul. 14, 2014

(86) PCT No.: PCT/EP2014/065026
§ 371 (c)(1),
(2) Date: Dec. 14, 2016

(87) PCT Pub. No.: WO2016/008506
PCT Pub. Date: Jan. 21, 2016

(65) Prior Publication Data
US 2017/0129033 A1    May 11, 2017

(51) Int. Cl.
*B23K 7/00* (2006.01)
*F23D 14/42* (2006.01)
(52) U.S. Cl.
CPC ............... *B23K 7/00* (2013.01); *F23D 14/42* (2013.01)
(58) Field of Classification Search
CPC .................................................... B23K 7/00
See application file for complete search history.

(56) References Cited

U.S. PATENT DOCUMENTS

| 4,293,096 A | 10/1981 | Braun | |
|---|---|---|---|
| 5,393,223 A * | 2/1995 | Goerde | F23D 14/465 431/258 |
| 2017/0129033 A1* | 5/2017 | Roubicek | F23D 14/42 |

FOREIGN PATENT DOCUMENTS

| EP | 0550051 A2 | 7/1993 |
|---|---|---|
| WO | WO-2011062492 A1 | 7/2011 |

OTHER PUBLICATIONS

International Search Report and Written Opinion dated Jun. 5, 2015 for PCT Application No. PCT/EP2014/065026.

* cited by examiner

*Primary Examiner* — Scott R Kastler
(74) *Attorney, Agent, or Firm* — Moser Taboada

(57) ABSTRACT

The present invention relates to a cutting torch system having an ignition mode and a cooling and cleaning mode. The cutting torch system comprises a cutting torch (1) having a cutting oxygen channel (4), a heating oxygen channel (5), and a fuel gas channel (6) The heating oxygen channel (5) and the fuel gas channel (6) are connected to an ignition mixer (7) and a fuel gas shut-off valve (8) is arranged upstream of the ignition mixer (7). The fuel gas shut-off valve (8) is configured to be open in the ignition mode and closed in the cleaning and cooling mode. The ignition mixer (7) is adapted for mixing heating oxygen and fuel gas into an ignition gas and communicating the ignition gas into the cutting oxygen channel (4) in the ignition mode, and for communicating heating oxygen into the cutting oxygen channel (4) in the cleaning and cooling mode.

16 Claims, 4 Drawing Sheets

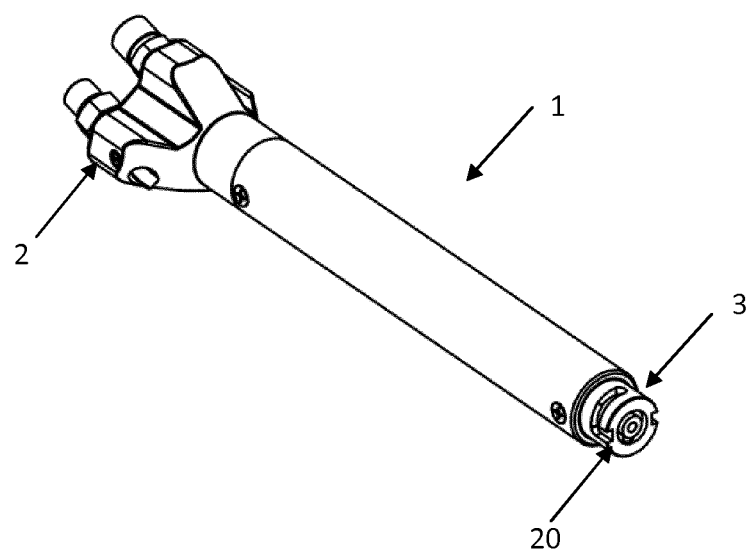
Fig. 3
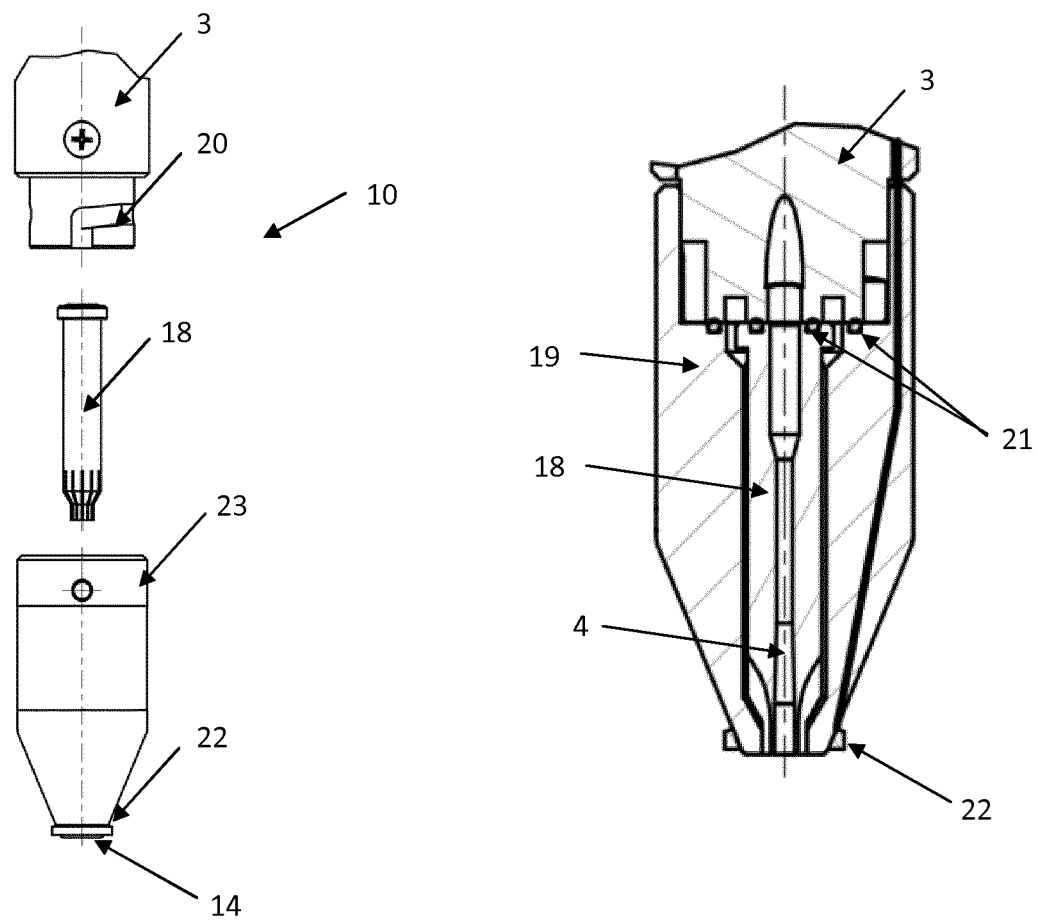
Fig. 4
Fig. 5

MACHINE CUTTING TORCH SYSTEM

FIELD OF THE INVENTION

The present invention relates to a cutting torch system comprising at least a cutting torch having a body and a head, a cutting oxygen channel, a heating oxygen channel, and a fuel gas channel, each channel being adapted for supplying a corresponding gas into the body of the cutting torch. The cutting torch system may further comprise an ignition device, a nozzle, a control system, and at least one sensor.

BACKGROUND OF THE INVENTION

Cutting metal using an automated machine cutting torch requires significant intervention from the machine operator in order to start and to adjust the cutting process. There is significant skill associated with setting up machine cutting torches, since often no two cutting torches carry the same parameters in set up. The cutting torch requires manual adjustment of oxygen and fuel gas pressure and flow rates during start-up. On each use, the flame of the cutting torch is ignited using an ignition device. Frequently, the ignition device has to be adjusted for good ignition. The oxygen and fuel gas pressure and flow rates are also often adjusted during operation.

The adjustments are conducted based upon operator experience and are made to the operator's best ability. The operator will often also change the nozzle, connected to the cutting torch, due to maintenance requirements or set up changes. This typically involves waiting for the cutting torch system to cool, unscrewing the nozzle using special wrenches, and thereafter replacing the nozzle. Following this, the cutting torch has to be set up once again. The nozzle often becomes blocked during operation due to spatter and incorrect flame set up. As a result, the cutting machine has to be stopped, the nozzle changed, and the system set up yet again. Also, during nozzle change there is no measurement or reflection of critical parameters such as gas pressure and flow rate.

Monitoring the consumption of gas is a further problem for the operator. As set up is purely manual, the gas consumption may vary significantly each time the cutting machine is used. Therefore, it is very challenging to predict the gas consumption and related costs.

The above described indicates that there is much room for improvement of current automated machine cutting torch systems.

Usually, a separate ignition device, such as an external torch or lighter, is used for igniting the cutting torch. Such an external ignition device requires that there is sufficient free space around the cutting torch, and also an additional fuel gas supply. An external solution also requires more spare parts, it makes the cutting machine more complicated, and it is necessary to adjust the ignition device to the correct position in order to ensure proper functioning. Further, external ignition devices are very frequently damaged or destroyed by the cutting process. Hence, there is more chance of function failure when using an external ignition device.

Existing internal ignition systems require additional supply of both oxygen and fuel gas, using two independent control valves, to be installed in the hazardous area. This leads to an expensive and complex solution which is difficult to control and set up. Further, an additional channel is needed inside the cutting torch for delivery of the ignition mixture to an area close to the ignition plug. One such internal ignition device is disclosed in U.S. Pat. No. 5,393,223.

Usually, cutting oxygen pressure is not measured at all at the cutting torch itself, which means that exact information about an important process parameter is missing. Pressure is normally measured at the pressure gauge on the pressure regulator or at the proportional valve inside the cutting machine, which is not sufficiently accurate. This is due to the oxygen pressure drop in the pipelines, the hoses, and other components arranged between the pressure regulator and the cutting torch.

The pressure may also be measured by using an additional gauge arranged externally between the hose and the cutting torch. However, the accuracy and life-time of such a solution is too low and its complexity is too high. Further, it is not always possible to use such an additional gauge.

The lack of exact information about the cutting oxygen pressure prevents simple optimization of the process parameters and causes a lower performance than necessary for the cutting process.

Nozzles are often changed manually by the operator, using special wrenches. This is a problem since the procedure takes time, and there is a risk of applying an excessive tightening torque, resulting in damages to the connecting thread and the sensitive nozzle surface.

A further problem is associated with adjusting the distance between nozzle and work piece such that the nozzle always is arranged at a correct height. One known solution is to connect each cutting torch to a separate sensor. However, such sensors take up valuable space within in the cutting machine, limit the movements of the cutting torch, are easily damaged by spatter, and often moves out of alignment such that the measured distance differs from the actual distance between nozzle and work piece.

As mentioned above, an automated machine cutting torch requires significant intervention from the operator in order to start up and to adjust the cutting process. Most adjustments are done based upon operator experience and are made to the operator's best ability. Hence, there are difficulties associated with achieving a correct set up and adjustment of oxygen and fuel gas parameters in response to the actual nozzle used.

As also mentioned above, a cutting torch usually requires manual cleaning and maintenance, e.g. nozzle changes. This is usually done based upon operator experience and is made to the operator's best ability. Nozzle change typically involves waiting for the cutting torch system to cool, unscrewing the nozzle using special wrenches, and thereafter replacing the nozzle.

Nozzles are usually cleaned manually using a set of specific tools in order to remove spatter and in order to clean the surfaces. Nozzle maintenance is a task often performed with little precision. Operators use basic skills to clean the nozzle, but if it is done incorrectly it can significantly reduce the performance of the nozzle, and hence the torch, and could lead to safety issues. For example, if the cutting oxygen channel is opened up incorrectly, an unbalanced flow of oxygen could arise which will lead to a sub-optimal cutting profile and could also lead to a flashback of excess oxygen into the nozzle and cutting torch.

SUMMARY OF THE INVENTION

It is an object of the present invention to mitigate the above problems, and to provide a cutting torch system which is easy to handle, has a higher degree of automation, has an increased lifetime, leads to savings in spare parts, gives better cut quality, has better cutting performance and shorter setting times, and which cuts equipment and process cost.

According to a first aspect of the present invention, these objects are achieved by a cutting torch system having an ignition mode and a cooling and cleaning mode, the cutting torch system comprising a cutting torch having a body and a head, the cutting torch further comprising a cutting oxygen channel, a heating oxygen channel, and a fuel gas channel, each channel being adapted at least for supplying a corresponding gas into the body of the cutting torch, the heating oxygen channel and the fuel gas channel being connected to an ignition mixer arranged in the body, a fuel gas shut-off valve arranged upstream of the ignition mixer, the fuel gas shut-off valve being configured to be open in the ignition mode and closed in the cleaning and cooling mode, the ignition mixer being adapted for mixing heating oxygen and fuel gas into an ignition gas and communicating the ignition gas, downstream of the ignition mixer, into the cutting oxygen channel in the ignition mode, the ignition mixer being adapted for communicating heating oxygen, downstream of the ignition mixer, into the cutting oxygen channel in the cleaning and cooling mode.

Such a cutting torch system provides a reliable, safe, fast, and simple way of flame ignition, with long lifetime and less risk of malfunction. The system is not dependent on the skill of the operator, nor is it dependent on a specific, predetermined maintenance schedule. The cutting torch system does not require the use of an additional channel for supplying ignition gas, while the necessary channels are easily used for both igniting the cutting torch and for cleaning.

The cutting torch system may further comprise a cutting mode, the ignition mixer being adapted for communicating heating oxygen, downstream of the ignition mixer, into the cutting oxygen channel in the cutting mode. This way, the cutting torch and the nozzle are continuously cleaned and cooled during the cutting of the work piece.

The body and the head of the cutting torch may be connected by the cutting oxygen channel, and the head may comprise an ignition plug for igniting the ignition gas in the ignition mode. The provision of an integrated ignition facilitates use, and eliminates the need for external ignition devices which are easily damaged during the cutting process.

In one embodiment, the body and the head are connected by the heating oxygen channel and the fuel gas channel, and the head is connected to a nozzle which comprises at least one heating mixer adapted for mixing heating oxygen and fuel gas into a heating gas, making the embodiment suitable for a nozzle mix type cutting torch.

In a further embodiment, the body and the head are further connected by a heating gas channel, the head is connected to a nozzle, and the body comprises a heating mixer adapted for mixing heating oxygen and fuel gas into a heating gas and communicating the heating gas, downstream of the heating mixer, into the heating gas channel, making the embodiment suitable for an torch mixing type cutting torch.

The fuel gas shut-off valve may be adapted for communicating fuel gas to the heating mixer in the cleaning and cooling mode and in the cutting mode, facilitating simple change-over between ignition mode and cleaning and cooling mode or cutting mode.

In one embodiment, the cutting torch and/or the nozzle comprises a cutting oxygen sensor for measuring the pressure and/or flow rate of the cutting oxygen in the cutting oxygen channel. More particularly, the body may comprise a cutting oxygen sensor for measuring the pressure and/or flow rate of the cutting oxygen in the cutting oxygen channel. This allows the operator to always have an overview of actual cutting oxygen and/or fuel gas conditions without the influence of flow and pressure losses in the pipes, the hoses or the valves within the system.

In one embodiment, the cutting torch system comprises a control system adapted for adjusting a flow rate and/or a pressure of the heating oxygen, the cutting oxygen, and/or the fuel gas supplied to the cutting torch body. The control system may be adapted for controlling the flow rate and/or the pressure of the cutting oxygen in the cutting oxygen channel based on the measurements from the cutting oxygen sensor. In one embodiment, the head of the cutting torch comprises a temperature sensor. The control system may also be adapted for changing the flow rate and/or the pressure of the heating oxygen, the cutting oxygen, and/or the fuel gas, depending on the temperature sensed by the temperature sensor. Having such an automatic arrangement, the cutting torch system can adjust or correct the gas conditions automatically when needed and in response to the measurements from the sensors.

The control system may further be adapted for controlling the mode of the cutting torch system, and the control system may further be adapted for changing the mode from the ignition mode to the cleaning and cooling mode based on the temperature sensed by the temperature sensor. The automatic arrangement can alternate the cutting torch system between modes, when needed and in response to measurements from the sensors or predetermined data.

In one embodiment, the control system is adapted for adjusting a flow rate and a pressure of the heating oxygen, the cutting oxygen, and/or the fuel gas, adjusting a proportion of the heating oxygen and the fuel gas in the ignition gas, alerting an operator of the cutting torch system regarding unsafe or unusual conditions in the cutting torch system, alerting an operator of the cutting torch system regarding a need for maintenance of the cutting torch system, performing maintenance of the cutting torch system, performing nozzle exchange, and automatically stopping the gas flow and/or operation of the cutting torch.

The nozzle may comprise an electronic identifier, and the control system may be adapted for adjusting a flow rate and/or a pressure of the heating oxygen, the cutting oxygen, and/or the fuel gas, and/or adjusting a proportion of the heating oxygen and the fuel gas in the ignition gas based on an identifier of the electronic identifier. The identifier may comprise data regarding a size of the nozzle, sizes of the channels in the nozzle, a nozzle type and/or model, a fuel gas type, a type of gas mixing system, a nozzle manufacturing date, a batch number, an identification/serial number, and nozzle operation start-up time. An electronic identifier may hold key information about the nozzle which is transmitted to a control system, which thereafter checks the cutting set up and adjusts it automatically when needed.

According to a second aspect of the present invention, these objects are achieved by a method for igniting and operating a cutting torch, the cutting torch comprising a cutting oxygen channel, a heating oxygen channel and a fuel gas channel, an ignition mixer being connected to the heating oxygen channel and the fuel gas channel, and a fuel gas shut-off valve upstream of the ignition mixer, wherein the method comprises an ignition process, a cooling and cleaning process, and a cutting process; the ignition process comprising the steps of mixing, in the ignition mixer, heating oxygen and fuel gas into an ignition gas, and communicating the ignition gas into the cutting oxygen channel downstream of the ignition mixer, the cooling and cleaning process comprising the steps of closing the fuel gas shut-off valve, communicating heating oxygen into the cutting oxygen channel downstream of the ignition mixer, the cutting process comprising the steps of communicating cutting oxygen into the cutting oxygen channel, where after the cutting oxygen is mixed with heating oxygen continuously fed by the ignition mixer into the cutting oxygen channel.

The above mentioned method provides a reliable, safe, fast, and simple way of flame ignition, with long lifetime and less risk of malfunction. The method is not dependent on the skill of the operator, nor is it dependent on a specific, predetermined maintenance schedule According to a third aspect of the present invention, these objects are achieved by a cutting torch comprising at least one sensor adapted for measuring a pressure and/or a flow rate within at least one gas channel in the cutting torch. The sensor may be adapted for measuring the pressure in the cutting oxygen channel.

This allows the operator to always have an overview of actual cutting oxygen and/or fuel gas conditions without the influence of flow and pressure losses in the pipes, the hoses or the valves within the system.

According to a fourth aspect of the present invention, these objects are achieved by a nozzle for a cutting torch having a cutting head, the nozzle comprising a cutting nozzle adapted to be arranged within a heating nozzle, wherein the heating nozzle comprises a height control sensor. The height control sensor may be arranged at a tip of the heating nozzle.

Such an integrated height sensor is less exposed to spatter than existing external sensors since it is arranged more or less completely within the gas stream flowing out from the nozzle. The integrated height sensor does not move out of alignment since it is a part of the nozzle, and therefore it always measures the correct distance between nozzle and work piece.

In one embodiment, the heating nozzle is at least partially made of an electrically insulating material, facilitating the integration of the sensor.

The heating nozzle may further comprise a temperature sensor, which allows measuring the temperature as close to the work piece as possible.

In a further embodiment, the heating nozzle is arranged to be connected to the cutting head by means of a bayonet coupling, providing a connection which does not require tools and therefore is simple, quick, and does not damage the nozzle or connection surfaces on the nozzle or torch head.

The nozzle may comprise at least two O-rings for sealing and separating gas flows within the nozzle, wherein a first O-ring is arranged between a contact surface on the heating nozzle and a contact surface on the cutting head, and wherein a second O-ring is arranged between a contact surface on the cutting nozzle and a contact surface on the cutting head, and wherein the O-rings are arranged such that a constant distance is maintained between a tip of the cutting nozzle and a tip of the heating nozzle. In one embodiment, the contact surfaces of the heating nozzle, the cutting nozzle, and the cutting head are perpendicular to a main gas flow direction in the nozzle of the cutting torch system. Further, the first O-ring may be arranged in a groove in the contact surface of the heating nozzle, and the second O-ring may be arranged in a groove in the contact surface of the cutting nozzle. The use of such axially fixed O-rings helps in defining the exact positions of and relative distances between the torch head, the cutting nozzle, and the heating nozzle. It is important to keep a constant distance between the tips of the cutting and heating nozzles, in order to maintain good performance stability for the heating flame.

According to a fifth aspect of the present invention, these objects are achieved by a nozzle for a cutting torch, comprising an electronic identifier holding information regarding the nozzle in an identifier. The electronic identifier may comprise a RFID, a NFC, a SIM, a capacitor, a resistor, and a micro processor. In one embodiment, the identifier comprises data regarding a size of the nozzle, sizes of the channels in the nozzle, a nozzle type and/or model, a fuel gas type, a type of gas mixing system, a nozzle manufacturing date, a batch number, an identification/serial number, and nozzle operation start-up time. An electronic identifier may hold key information about the nozzle which is transmitted to a control system, which thereafter checks the cutting set up and adjusts it automatically when needed.

The nozzle may further be connected to a cutting torch system comprising a control system, and the electronic identifier may be adapted for transmitting at least a part of the identifier to the control system upon request by the control system. The electronic identifier may be adapted for transmitting at least a part of the identifier to the control system via a wireless link between the electronic identifier and the control system. The electronic identifier may also be adapted for transmitting at least a part of the identifier to the control system via a wired link between the electronic identifier and the control system. Such an automatic arrangement can adjust or correct the gas conditions automatically, in response to the measurements from sensors or predetermined data such as the above mentioned identifiers.

According to a sixth aspect of the present invention, these objects are achieved by a control system adapted for controlling a cutting torch, the cutting torch comprising at least one channel adapted for connection to a nozzle connected to the head of the cutting torch, the control system being adapted for performing a cleaning process of the nozzle (10) and/or the cutting torch upon start-up of the cutting torch, wherein the cleaning process comprises communicating one or several bursts of oxygen through the at least one channel.

Using bursts of oxygen is a very simple and efficient way of cleaning one or several channels within a nozzle or a cutting torch from spatter remains, while simultaneously providing extra cooling of the nozzle and the cutting torch.

According to a seventh aspect of the present invention, these objects are achieved by a parking system for use in a cutting torch system according to the above, wherein the parking system comprises a rotatable gripping arm, at least one cleaning arm, and at least one sensor, and wherein the parking system is adapted for use in a nozzle exchange process, a nozzle cleaning process, and/or a nozzle testing process. The rotatable gripping arm may comprise at least two locating grips adapted for clasping a nozzle, arranged on a cutting torch, and wherein the rotatable gripping arm is adapted for rotating the nozzle, and thereafter releasing the nozzle from the cutting torch.

A parking system automates the changing, cleaning, testing, and set up of nozzles such that it is no longer necessary to rely on the skill of the operator. It is also no longer necessary to wait for the system to cool, before unscrewing the nozzle, nor is it necessary to use special tools.

These objects are also achieved by a method of exchanging a nozzle, a method of cleaning a nozzle, and a method of testing a nozzle using the parking system. The method of exchanging a nozzle may comprise the steps of moving the cutting torch, provided with a nozzle, to a parking position within the parking system, and removing the nozzle from the cutting torch by means of the rotatable gripping arm, fitting a new nozzle to the cutting torch by means of the rotatable gripping arm, and moving the cutting torch back to its initial position. The method of cleaning a nozzle may comprise the steps of moving the cutting torch, provided with a nozzle, to a parking position within the parking system, and cleaning of the nozzle using at least one tool arranged on a cleaning arm, and moving the cutting torch back to its initial position. The method of testing a nozzle may comprise the step of igniting the cutting torch while monitoring and altering cutting parameters by means of at least one sensor and a control system. The method of testing a nozzle may further comprise the step of moving a test piece to a position adjacent the cutting torch for conducting a test cut in the test piece. These automatic changing, cleaning, and testing methods remove the need for manual labour, dependent on the skill of the operator, and reduces the need of a specific, predetermined maintenance schedule since maintenance is performed automatically when needed, e.g. in response to measurements from the sensors within the system.

Generally, all terms used in the claims are to be interpreted according to their ordinary meaning in the technical field, unless explicitly defined otherwise herein. All references to "a/an/the [element, device, component, means, etc]" are to be interpreted openly as referring to at least one instance of said element, device, component, means, etc., unless explicitly stated otherwise. Further, by the term "comprising" it is meant "comprising but not limited to" throughout the application.

BRIEF DESCRIPTION OF THE DRAWINGS

This and other aspects of the present invention will now be described in more detail, with reference to the appended drawings showing currently preferred embodiments of the invention.

FIG. 3 shows a perspective view of a cutting torch according to the present invention.

FIG. 4 shows an exploded view of a nozzle according to the present invention.

FIG. 5 shows cross sectional view of a cutting torch head and a nozzle according to the present invention.

DETAILED DESCRIPTION

The invention relates to a combination of innovative systems which generate a new machine cutting torch design philosophy. It comprises a number of highly related elements such as: an ignition mixer for preparation of an ignition gas used together with an internal cooling and cleaning device as disclosed in EP-0,191,741; pressure, temperature, and flow measuring devices; a manually quick-tightened cutting and/or heating nozzle provided with a height control sensor; automatic identification of nozzles and adjustment of oxygen and fuel gas parameters; process control for cleaning, and process automation for cleaning and changing of nozzles.

Figure 1:
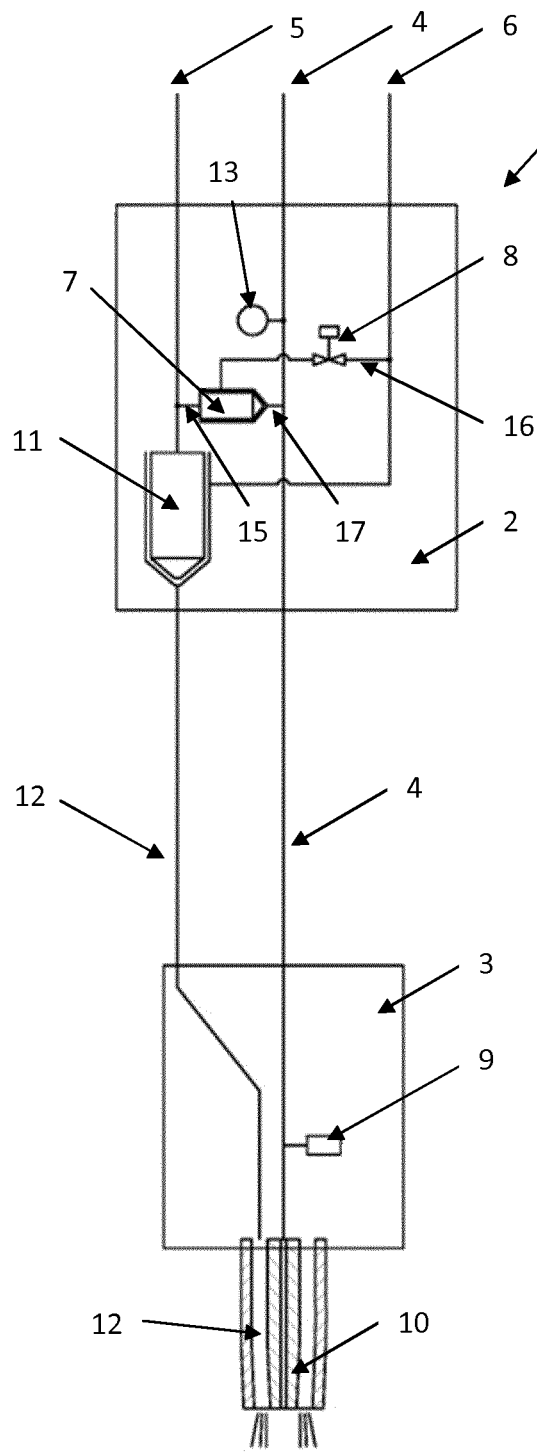
FIG. 1 shows a schematic view of a first embodiment of the cutting torch system according to the present invention.
Figure 2:
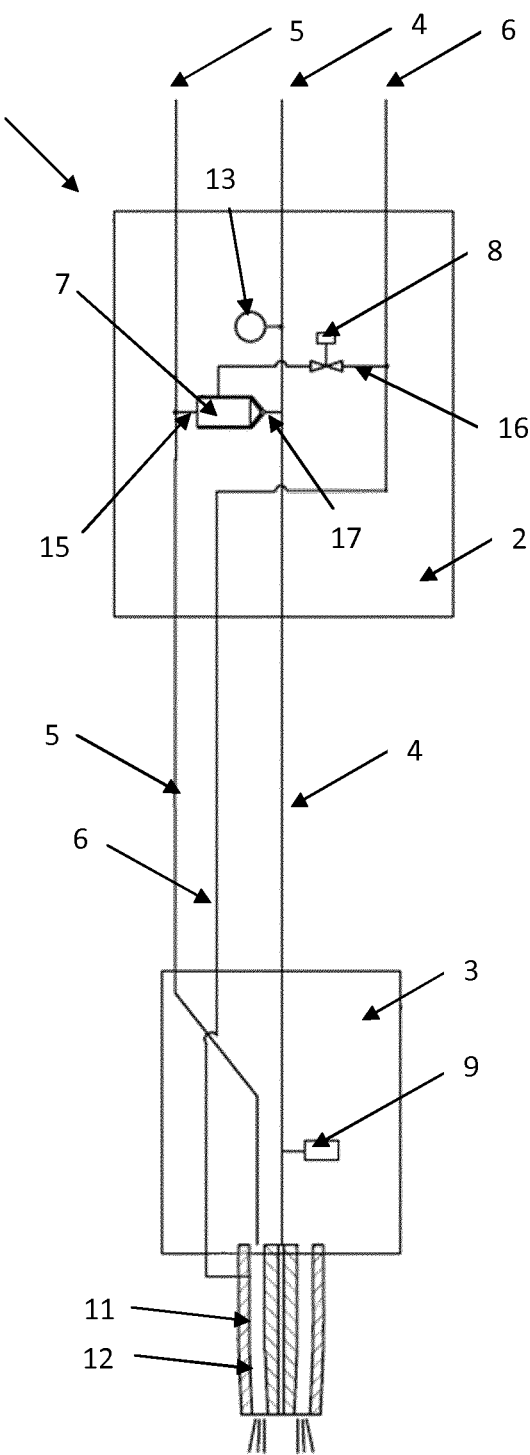
FIG. 2 shows a schematic view of a second embodiment of the cutting torch system according to the present invention.
Figure 6:
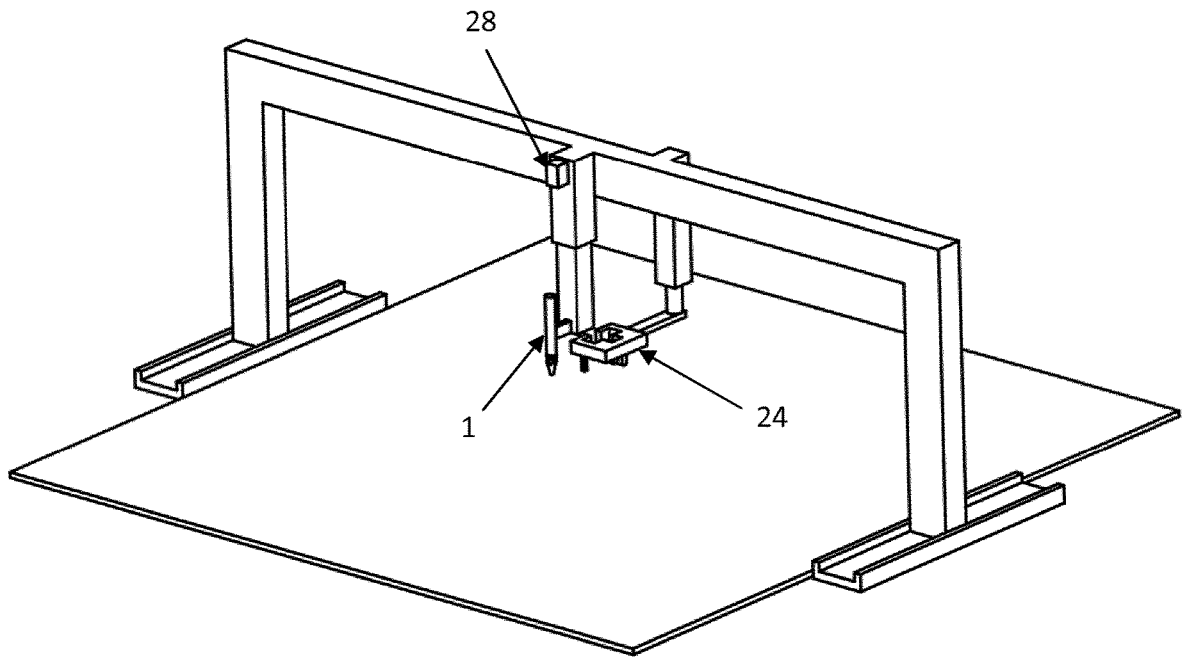
FIG. 6 shows a perspective view of a cutting machine system according to the present invention.
Figure 7:
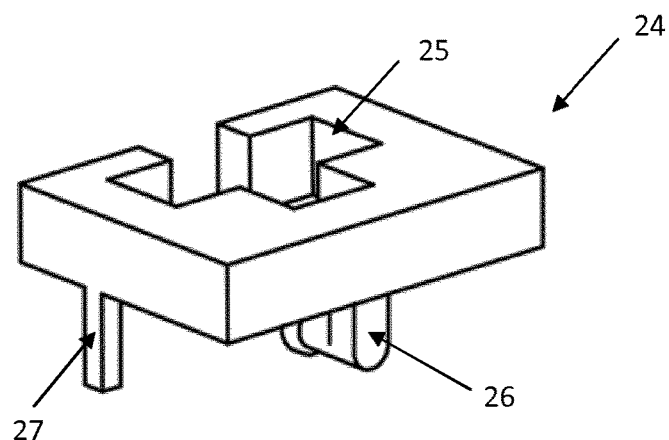
FIG. 7 shows a perspective view of a parking system according to the present invention.
Figure 8:
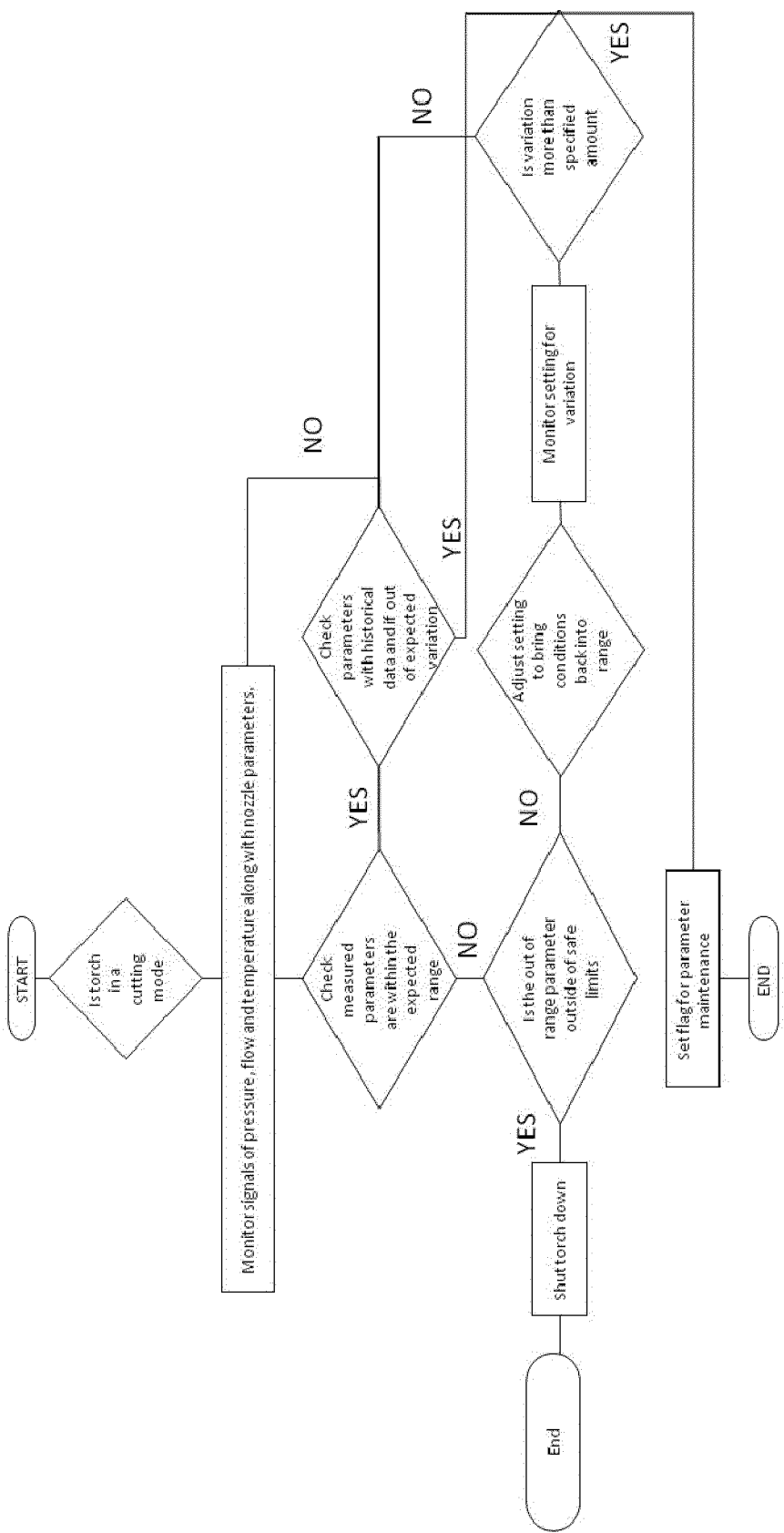
FIG. 8 shows a decision tree used for adjusting operating parameters and/or initiating maintenance.

FIGS. 1 and 2 show two different embodiments of a cutting torch system according to the invention. The cutting torch 1 comprises a body 2 and a head 3. A cutting oxygen channel 4, a heating oxygen channel 5, and a fuel gas channel 6 are connected to an inlet side of the body 2, having one inlet each, and supplies cutting oxygen, heating oxygen, and fuel gas, respectively, to the cutting torch body 2.

The body 2 and the head 3 of the cutting torch are connected to each other by two or three tubes, each tube comprising a continuation of the channel for cutting oxygen 4, a continuation of the channel for heating oxygen 5, a continuation of the channel for fuel gas 6, and/or a channel for heating gas 12.

The channel for cutting oxygen 4 will also be used for ignition gas. Both heating gas and ignition gas consist of a mixture of heating oxygen and fuel gas, however in different amounts and proportions. The heating and ignition gases will be described more in depth below.

The inventive cutting torch is provided with at least one heating mixer 11 for mixing heating oxygen, from the heating oxygen channel 5, and fuel gas, from the fuel gas channel 6, to a heating gas. In FIG. 1, the heating mixer 11 is arranged in the body 2 of the cutting torch (a so called torch mixing type cutting torch), and in FIG. 2 the heating mixer 11 is arranged in a nozzle 10 connected to the head 3 of the cutting torch (a so called nozzle mix type cutting torch). When the heating mixer 11 is arranged in the body 2 of the cutting torch, the body 2 and head 3 are connected by two tubes, i.e. the cutting oxygen channel 4 and the heating gas channel 12. The heating gas channel 12 extends from the heating mixer 11 to the head 3. When the heating mixer(s) 11 is/are arranged in the nozzle 10, the body 2 and head 3 are connected by three tubes, i.e. the cutting oxygen channel 4, the heating oxygen channel 5, and the fuel gas channel 6.

An ignition mixer 7 is arranged within the body 2 of the cutting torch, and the heating oxygen channel 5 and the fuel gas channel 6 are connected, by means of bypass channels 15, 16, to an inlet side of the ignition mixer 7. A fuel gas shut-off valve 8 is arranged upstream of the ignition mixer 7 on the fuel gas bypass channel 16.

In other words, the embodiment of FIG. 1 shows a cutting oxygen channel 4 which is connected to the inlet side of the body 2 and which thereafter continues directly, through one of the tubes, to the head 3 and the cutting nozzle 10. The heating oxygen channel 5 is connected to the inlet side of the body 2, i.e. to the heating mixer 11. Upstream of the heating mixer 11, the heating oxygen channel 5 is also connected to a heating oxygen bypass channel 15 which, in turn, is connected to the ignition mixer 7. The fuel gas channel 6 is, similarly, connected to the inlet side of the body 2, i.e. to the heating mixer 11. Upstream of the heating mixer 11, the fuel gas channel 6 is also connected to a fuel gas bypass channel 16 which is connected to the ignition mixer 7. From the ignition mixer 7, an ignition channel 17 continues to the cutting oxygen channel 4. Downstream of the heating mixer 11, a heating gas channel 12 extends, through another tube, to the head 3 and the cutting nozzle 10.

In a corresponding way, the embodiment of FIG. 2 shows a cutting oxygen channel 4 which is connected to the inlet side of the body 2 and which thereafter continues, through one of the tubes, to the head 3 and the cutting nozzle 10. The heating oxygen channel 5 and the fuel gas channel 6 are also connected to the inlet side of the body 2, and thereafter continue, through one tube each, to the head 3 and the cutting nozzle 10. The heating oxygen channel 5 and the fuel gas channel 6 are connected to at least one heating mixer 11, but preferably several heating mixers 11, which in this embodiment is/are arranged within the nozzle 10. Downstream of the heating mixer/heating mixers 11, a number of heating gas channels 12 extend through the cutting nozzle 10. Within the body 2, the heating oxygen channel 5 is also connected to a heating oxygen bypass channel 15 which, in turn, is connected to an ignition mixer 7. The fuel gas channel 6 is also connected to a fuel gas bypass channel 16 which is connected to the ignition mixer 7. An ignition channel 17 continues from the ignition mixer 7 to the cutting oxygen channel 4.

The head 3 of the cutting torch comprises an ignition plug 9 for igniting the ignition gas.

As mentioned above, heating oxygen and fuel gas are mixed in the heating mixer 11 in order to make heating gas. The heating gas is communicated via the heating gas channel 12 to the head 2 where the nozzle 10 is arranged, see FIG. 1. Alternatively, the heating oxygen and fuel gas are mixed in the heating mixer(s) 11 arranged within the nozzle 10, see FIG. 2. The heating gas is guided from the heating mixer through holes or slots in the nozzle 10, and is ignited at the nozzle tip in order to form a flame. Cutting oxygen, on the other hand, is communicated directly through the body 2, the cutting oxygen channel 4, and the head 3 into the nozzle 10, and is used as cutting media as soon as the work piece has been prepared such that the cutting process can be started. In order to ignite the flame, an ignition gas is needed. An ignition mixer 7 is used for preparing such an ignition gas consisting of defined amounts/rates of oxygen and fuel gas. Oxygen and fuel gas used for the ignition gas is communicated to the ignition mixer 7 in parallel with the oxygen and the fuel gas used for the heating gas. A solenoid valve 8, or other type of shut-off valve, switches the fuel gas, communicated to the ignition mixer 7, on and off.

The cutting torch system has three gas supply modes: ignition mode, cooling and cleaning mode, and cutting mode. These modes are used throughout the application to describe the flow of gas within the cutting torch 1 and the nozzle 10. Different gas flows are used in different sequences of operation. The machine cutting torch operates in four subsequent sequences during use: an ignition sequence, a preheating sequence, a piercing sequence, and a cutting sequence. The torch is ignited during the ignition sequence, i.e. a heating gas comprising heating oxygen and fuel gas is supplied and ignited, forming a heating flame. During the preheating sequence, the work piece is heated by the heating flame to a temperature which will support combustion. During the piercing sequence, cutting oxygen is added and ignited, forming a cutting flame. The cutting flame pierces the heated work piece, creating a hole from which the subsequent cutting is performed in the cutting sequence. Hence, the ignition mode is used during the ignition sequence, while the cooling and cleaning mode and the cutting mode are used during the preheating sequence, the piercing sequence, and/or the cutting sequence.

The fuel gas shut-off valve 8 is configured to be open in the ignition mode and closed in the cleaning and cooling mode and in the cutting mode. I.e., the fuel gas shut-off valve 8 communicates fuel gas to the ignition mixer 7 in the ignition mode and to the heating mixer 11 in the cleaning and cooling mode and in the cutting mode.

During ignition mode, heating gas is communicated through the system as described above and blows out of the nozzle 10. Also, heating oxygen is communicated continuously into the ignition mixer 7, and the fuel gas solenoid valve 8 is open such that fuel gas is communicated to the ignition mixer 7 as well. Ignition gas is formed within the ignition mixer 7, through mixing of the heating oxygen and the fuel gas, and the ignition gas is thereafter communicated, downstream of the ignition mixer 7 through ignition channel 17, into the cutting oxygen channel 4 where it is eventually ignited by an ignition (sparkling or glow) plug 9 arranged in the head 3 of the cutting torch 1. The ignition flame is blown away from the cutting oxygen channel 4, externally of the nozzle 10, and hence ignites the heating gas. This way, a heating flame is formed.

Thereafter, the cleaning and cooling mode is started. The fuel gas solenoid valve 8 is closed. Heating oxygen is still communicated continuously via the ignition mixer 7, through the ignition channel 17 and the cutting oxygen channel 4 to the nozzle 10. The heating oxygen flow cools and cleans the complete cutting torch and nozzle. The cooling is also supported by the so called Coolex system, as disclosed in EP-0,191,741. The Coolex system, in combination with the ignition mixer 7, will enable the use of electronics within the cutting torch head 3 due to reduced temperatures and increased free and available space within the head 3.

Finally, and as soon as the work piece is prepared for the cutting process, the cutting oxygen supply is opened and the cutting process is started, i.e. the system is in cutting mode. In the cutting mode, the ignition mixer 7 continues to communicate heating oxygen via the ignition mixer 7 into the cutting oxygen channel 4, as described above.

In other words, the method for igniting and operating a cutting torch 1, where the cutting torch comprises a cutting oxygen channel 4, a heating oxygen channel 5, a fuel gas channel 6, an ignition mixer 7 being connected to the heating oxygen channel 5 and the fuel gas channel 6, and a fuel gas shut-off valve 8 arranged upstream of the ignition mixer 7, comprises an ignition process, a cooling and cleaning process, and a cutting process. The ignition process comprises the steps of mixing, in the ignition mixer 7, heating oxygen and fuel gas into an ignition gas, and communicating the ignition gas into the cutting oxygen channel 4 downstream of the ignition mixer 7, the cooling and cleaning process comprises the steps of closing the fuel gas shut-off valve 8, communicating heating oxygen into the cutting oxygen channel 4 downstream of the ignition mixer 7, and the cutting process comprises the steps of communicating cutting oxygen into the cutting oxygen channel 4, where after the cutting oxygen is mixed with heating oxygen continuously fed by the ignition mixer 7 into the cutting oxygen channel 4.

The body 2 of the cutting torch may further comprise a cutting oxygen sensor 13 for measuring the pressure and/or flow rate of the cutting oxygen in the cutting oxygen channel 4.

Also, the cutting torch system advantageously comprises a control system adapted for adjusting the flow rate and/or pressure of the heating oxygen, the cutting oxygen, and/or the fuel gas supplied to the cutting torch body 2 through the channels 4, 5, 6. Preferably, the control system is adapted for controlling the flow rate and/or the pressure of the cutting oxygen in the cutting oxygen channel 4 based on measurements made by the cutting oxygen sensor 13. The hardware of the control system, along with valves and other components, may be arranged in a control box 28 located, e.g., on top of the carriage of the cutting machine.

The head 3 of the cutting torch may comprise a temperature sensor 14. Preferably, the control system is adapted for changing the flow rate and/or the pressure of the heating oxygen, the cutting oxygen, and/or the fuel gas, in response to the temperature sensed by the temperature sensor 14. Further, the control system may be adapted for controlling the mode of the cutting torch system, preferably for changing the mode from the ignition mode to the cleaning and cooling mode in response to the temperature sensed by the temperature sensor 14.

The control system may be adapted for adjusting the flow rate and the pressure of the heating oxygen, the cutting oxygen, and/or the fuel gas, for adjusting the proportions of the heating oxygen and the fuel gas in the ignition gas, for alerting the operator of the cutting torch system about unsafe or unusual conditions in the cutting torch system, for alerting the operator of the cutting torch system about the need for maintenance of the cutting torch system, for performing maintenance of the cutting torch system, for performing nozzle exchange, and for automatically stopping the gas flow and/or operation of the cutting torch.

The cutting nozzle 10 may comprise an electronic identifier 23, and the control system may be adapted for adjusting the flow rate and/or the pressure of the heating oxygen, the cutting oxygen, and/or the fuel gas, and/or adjusting the proportions of the heating oxygen and the fuel gas in the ignition gas based on a identifier of the electronic identifier 23. In particular, the flow rate and/or the pressure of the above mentioned gases may be adjusted in response to the specific nozzle parameters for the preheating sequence and the piercing sequence, and also the time per each sequence needs to be set. The electronic identifier 23 will also initiate a warning alert when the nozzle is used with the wrong fuel gas type or the wrong torch type.

Hence, the identifier, e.g., comprises data regarding the size of the nozzle, the size of the channels in the nozzle, the nozzle type and/or model, the fuel gas type, the type of gas mixing system, the nozzle manufacturing date, the batch number, the identification/serial number of the nozzle, and nozzle operation start-up time.

A pressure gauge or pressure sensor 13 may be installed in the body 2 of the cutting torch 1 in order to measure the pressure and/or flow rate within the gas channels in the cutting torch 1. Preferably, the sensor 13 is a cutting oxygen sensor adapted for measuring the pressure and/or flow rate of the cutting oxygen in the cutting oxygen channel 4 at the position which is closest to the cutting nozzle 10.

This way, the operator always has an overview over current cutting oxygen and fuel gas conditions, without any influence of flow and pressure losses in pipes, hoses, and valves. As mentioned above, the sensors may be connected directly to the control system of the cutting torch system. With such an automated solution, the cutting machine can automatically adjust or correct gas conditions of the proportional valve in response to data collected by the sensors. The hardware of the control system, the proportional valve, shut-off valves etc. may be arranged in a control box 28 located, e.g., on top of the carriage of the cutting machine. For instance, the flame ignition can be controlled precisely for safe start up including checking of heating oxygen and fuel gas pressure and/or flow rate, and giving feedback that the flame has been ignited (through use of a temperature sensor). Another example is that the oxygen flow rate can be decreased on cold days in order to compensate for the gas being denser, and the fuel gas pressure can be increased in order to compensate for its lower pressure. Further, automatic stopping of the cutting torch system is possible if unsafe or unusual conditions are detected, e.g. when there is spatter build up on the nozzle 10. Also, preventative maintenance of the nozzle 10 can be flagged by the system after monitoring a combination of pressure, flow rate, and temperature in the cutting torch 1.

The cutting torch system advantageously comprises a control system adapted for adjusting the flow rate and/or pressure of the heating oxygen, the cutting oxygen, and/or the fuel gas supplied to the cutting torch body 2 through the channels 4, 5, 6. Preferably, the control system is adapted for controlling the flow rate and/or the pressure of the cutting oxygen in the cutting oxygen channel 4 based on measurements made by the cutting oxygen sensor 13.

The head 3 of the cutting torch may comprise a temperature sensor 14. Preferably, the control system is adapted for changing the flow rate and/or the pressure of the heating oxygen, the cutting oxygen, and/or the fuel gas, in response to the temperature sensed by the temperature sensor 14. Further, the control system may be adapted for controlling the mode of the cutting torch system, preferably for changing the mode from the ignition mode to the cleaning and cooling mode in response to the temperature sensed by the temperature sensor 14.

The control system may be adapted for adjusting the flow rate and the pressure of the heating oxygen, the cutting oxygen, and/or the fuel gas, adjusting a proportion of the heating oxygen and the fuel gas in the ignition gas, alerting an operator of the cutting torch system regarding unsafe or unusual conditions in the cutting torch system, alerting an operator of the cutting torch system regarding the need for maintenance of the cutting torch system, performing maintenance of the cutting torch system and automatically stopping the operation of the cutting torch.

The cutting nozzle 10 may comprise an electronic identifier 23, and the control system may be adapted for adjusting the flow rate and/or the pressure of the heating oxygen, the cutting oxygen, and/or the fuel gas, and/or adjusting a proportion of the heating oxygen and the fuel gas in the ignition gas based on a identifier of the electronic identifier 23. The identifier comprises data regarding the size of the nozzle, the size of the channels in the nozzle, the nozzle type and/or model, the fuel gas type, the type of gas mixing system, the nozzle manufacturing date, the batch number, the identification/serial number, and nozzle operation start-up time.

The cutting torch system may include a nozzle 10 comprising a cutting nozzle 18 and a heating nozzle 19, where the cutting nozzle 18 is arranged within the heating nozzle 19. The heating nozzle 19 is connected manually to the head 3 of the cutting torch 1 by means of a bayonet coupling 20 comprising a pin and a groove to be rotated in relation to each other. I.e., the nozzle 10 is rotated, e.g. 90° anticlockwise, releasing the pins on the nozzle 10 from their locking position in the groove on the head 2. Thereafter, the nozzle 10 is free to be removed from the cutting torch 1. The rotation is e.g. 90° anticlockwise, however, any suitable degree and direction of rotation is possible.

The nozzle 10 preferably comprises at least two O-rings 21 for sealing and separating the gas flows within the nozzle 10. The first O-ring is arranged between a contact surface on the heating nozzle 19 and a contact surface on the cutting head 3, lying in abutment with both contact surfaces. The second O-ring is arranged between a contact surface on the cutting nozzle 18 and a contact surface on the cutting head 3, lying in abutment with both contact surfaces. The O-rings 21 are arranged such that a constant distance is maintained between the tip of the cutting nozzle 18 and the tip of the heating nozzle 19. The first O-ring is preferably arranged in a groove in the contact surface of the heating nozzle 19, and the second O-ring is preferably arranged in a groove in the contact surface of the cutting nozzle 18.

The heating nozzle 19 is, at least partially, made of an electrically insulating material such as ceramics or certain types of plastic.

The tip of the heating nozzle 19 comprises a height control sensor 22. The height control sensor 22 measures the electrical capacitance between the nozzle 10 and the work piece, i.e. the distance between nozzle 10 and work piece. The height control sensor may be connected to a control system, either wirelessly or by wire. The wire may be a conventional copper wire arranged in a drilled channel within the nozzle, or a liquid metal poured into a channel or groove wherein it solidified.

The heating nozzle 19 may also comprise a temperature sensor 14. Preferably, the control system is adapted for changing the flow rate and/or the pressure of the heating oxygen, the cutting oxygen, and/or the fuel gas, in response to the temperature sensed by the temperature sensor 14. Further, the control system may be adapted for controlling the mode of the cutting torch system, preferably for changing the mode from the ignition mode to the cleaning and cooling mode in response to the temperature sensed by the temperature sensor 14.

The cutting torch system may comprise a cutting nozzle 10 provided with an electronic identifier 23 such as a RFID, a NFC, a resistor, or a micro processor. The electronic identifier 23 may hold key information regarding the nozzle 10 in an identifier comprising data regarding the size of the nozzle, the size of the channels in the nozzle, the nozzle type and/or model, the fuel gas type, the type of gas mixing system, the nozzle manufacturing date, the batch number, the identification/serial number, and nozzle operation start-up time.

Nozzle operation start-up time refers to the time of starting the operation of a particular nozzle, which the operator can set using an external device. Based on the nozzle lifetime, preventative nozzle exchange can thereafter be announced by the system.

The nozzle can be connected to a control system for the cutting torch system using the nozzle 10, and the electronic identifier 23 can be adapted for transmitting at least a part of the identifier to the control system upon request of the control system. The cutting set up is checked and changed automatically upon nozzle replacement, by the use of such an electronic identifier 23.

The identification may be transmitted via a wired link between the electronic identifier and the control system, wherein the head 2 is provided with a communication point for contact with the electronic identifier 23, or wirelessly via a wireless link between the electronic identifier and the control system. Adjustments of fuel gas supply, oxygen supply, and ignition gas supply may be made automatically. This information in combination with monitoring of the fuel gas and oxygen supply conditions will enable prediction of upcoming nozzle replacement. In particular, the flow rate and/or the pressure of the different gases may be adjusted in relation to specific parameters used for the preheating sequence and the piercing sequence, such as thickness of the work piece, cutting speed, and the distance between nozzle and work piece. The time per each sequence may also be set. The electronic identifier 23 will also initiate a warning alert when the nozzle 10 is used with the wrong fuel gas type or the wrong torch type.

On start up, the sensors within the cutting torch system can be checked for good operation (i.e. signal checks). It is also checked if the gases meet the requirements of the specific nozzle 10 which is used (i.e. signal value), and if maintenance is required (i.e. an interpretation of information including data related to the actual nozzle).

At start up, the control system may also initiate cleaning of the nozzle 10 and/or the cutting torch 1 by switching the cutting torch 1 on and off a number of times, wherein short bursts of high flow oxygen is communicated through at least one of the channels, i.e. the cutting oxygen channel 4, the heating oxygen channel 5, the fuel gas channel 6, and/or the heating gas channel 12, to remove spatter. The cleaning sequence practically means that all shut-off valves, all proportional valves, and all regulators are open fully to the max. Each burst lasts a few seconds and the actual flow depends on the actual gas channel and nozzle size, but it usually varies between 1-40 $Nm^3/h$. The burst not only cleans, but also cools, the nozzle 10 and cutting torch 1. This type of cleaning is preferably done after each cut or at pre-defined time intervals during the cutting process.

Further, automated cleaning may be performed using a parking system 24, which is described more in detail below. This type of cleaning is done more seldom since it comprises mechanical cleaning which is more time consuming.

The cutting torch system may further comprise a so called parking system 24. The parking system 24 consists of a bay in which a multitude of activities can be conducted for the purpose of maintenance and machine set up changes, primarily nozzle change, nozzle cleaning, and/or nozzle testing. The cutting torch 1 is parked in a parking area within the parking system 24 by pushing it towards an interior wall of the system 24.

The cutting torch 1 may be moved to the parking system 24, i.e. the parking system 24 may be stationary. However, the parking system 24 may be moved to each individual cutting torch 1 instead. When the cutting machine comprises more than one torch, it is preferable if the parking system 24 is movable. This way, it can service one or several particular torch(es), and not necessarily of all of the torches. Also, the cutting torch 1 itself can be separated from the cutting machine, using the parking system.

Nozzle change is conducted by moving the cutting torch into a parked position, in which the nozzle 10 may be removed by a rotatable gripping arm 25.

In a preferred embodiment, the nozzle 10 is attached to the head 3 of the cutting torch 1 by means of a bayonet coupling. For this embodiment, the rotatable gripping arm 25 has at least two locating grips which clasp the nozzle bevels. Once tightly grasped, the nozzle 10 is rotated, e.g. 90° anticlockwise, releasing a pin on the nozzle 10 from its locking position in a groove on the head 2, where after the nozzle 10 is free to be removed from the cutting torch 1. However, any suitable degree and direction of rotation is possible.

The rotatable gripping arm 25 thereafter releases the nozzle 10 by moving the cutting torch 1 upward, by loosening the grip on the nozzle 10 in order to simply drop it downwards, or by moving the rotatable gripping arm 25 downwards to release the nozzle 10. Both the cutting nozzle 18 and the heating nozzle 19 are released at the same time.

For replacement of the cutting nozzle 18, for instance in the case of a machine set up change, the cutting nozzle 18 needs to be removed from the nozzle 10. This can be done in various ways such as by means of a gripper moved over the cutting nozzle 18, which locates itself on the cutting nozzle 18 and engages with the O-ring 21, with the splines on the outside of the cutting nozzle 18, or with the oxygen channel 4 on the inside of the cutting nozzle 18. Alternatively, the main nozzle 10, i.e. both the cutting nozzle 18 and the heating nozzle 19, could be rotated through a vertical 180 degrees at which point the cutting nozzle 18 will fall out from the heating nozzle 19 from its own mass. The cutting nozzle 18 may then be replaced using the same method, i.e. the rotatable gripping arm 25, or by loading one nozzle into/onto another by, e.g., using a nozzle holder, arranged in a horizontal plane, and a pin which pushes the inner cutting nozzle 18 into the outer heating nozzle 19.

Also, the nozzle may be changed more easily by exchanging the cutting and heating nozzles 18, 19 simultaneously, i.e. together. Afterwards, during continuous machine operation, the operator will check the spare nozzles stock and change the removed cutting nozzle manually if needed.

The cleaning of the nozzle 10 is completed in the parking area using two main tools, a rotating fine wire brush and/or a set of hardened steel shaped pins. The rotating fine wire brush can be presented to the nozzle 10 using a cleaning arm 26 along with optical guidance or specific machine coding. When the nozzle 10 is attached to the cutting torch 1, the wire brush can be used to clean the main outer areas of the nozzle 10 and the torch 1. Cleaning using the hardened steel pins to dislodge debris can be controlled, also using a cleaning arm 26, to insert the pins into the gas channels to which the pins are specifically shaped for. Optical guidance, in both cases, not only avoids clashes of the system but can give feedback of the quality of cleaning.

As described above, the rotatable gripping arm 25 and the cleaning arm 26 are moveable robotic arms. However, the device 25 and the arm 26 may be stationary, while the cutting torch 1 is moveable.

Testing of the nozzle 10 can also be conducted in the parking area. This may be prompted following logging of an unexpected parameter change, a drift in parameter readings, following nozzle exchange or following cleaning. Testing is conducted by monitoring the on torch sensors plus additionally an optical sensor, a noise sensor, and/or a thermal sensor 27. One type of test is conducted by simply igniting the torch while monitoring and altering the cutting parameters. A further test can be conducted by moving a test piece into use to physically cut a plate, while monitoring and adjusting the parameters.

The optical sensor 27 is used to check the flame profile and colour, and the flame profile is crosschecked against a pre-set flame profile for the specific nozzle. The flame profile may be checked during the ignition sequence, the preheating sequence, the piercing sequence, and/or the cutting sequence.

The noise sensor 27 checks the ignition of the cutting torch 1. The noise caused by ignition under correct conditions gives a specific trace from which an allowable tolerance is pre-set. Amplitude, timing, and tone are of interest. Of particular interest is the monitoring for sharp peaks which indicate back-fires and poor operating conditions of the cutting torch 1.

The thermal sensor 27 is used to consider the torch body 2 temperature and flame temperature. Thermal measurements can indicate poor flame conditions and any defects in the torch body 2.

Additional areas that can be checked in the parking system 24 are that the cutting torch 1 is set perpendicular to the cutting surface of the work piece, which can be done using the optical sensor 27, and the tightening torque of the bayonet coupling for the quick fit system, which can be done using a torque sensor on the rotatable gripping arm 25.

The person skilled in the art realizes that the present invention by no means is limited to the preferred embodiments described above. On the contrary, many modifications and variations are possible within the scope of the appended claims. For example, any combination of above described features is possible.

The invention claimed is:

1. A method for igniting and operating a cutting torch, the cutting torch comprising a cutting oxygen channel, a heating oxygen channel and a fuel gas channel, an ignition mixer being connected to the heating oxygen channel and the fuel gas channel, and a fuel gas shut-off valve upstream of the ignition mixer, wherein the method comprises an ignition process, a cooling and cleaning process, and a cutting process;

the ignition process comprising the steps of
mixing, in the ignition mixer, heating oxygen and fuel gas into an ignition gas, and
communicating the ignition gas into the cutting oxygen channel downstream of the ignition mixer, the cooling and cleaning process comprising the steps of
closing the fuel gas shut-off valve,
communicating heating oxygen into the cutting oxygen channel downstream of the ignition mixer, the cutting process comprising the steps of
communicating cutting oxygen into the cutting oxygen channel, where after the cutting oxygen is mixed with heating oxygen continuously fed by the ignition mixer into the cutting oxygen channel.

2. The method of claim 1, wherein the cutting process further comprises communicating, via the ignition mixer, heating oxygen to the cutting oxygen channel.

3. The method of claim 1, further comprising igniting, via an ignition plug, the ignition gas in an ignition mode, wherein a body and a head of the cutting torch are connected by the cutting oxygen channel.

4. The method of claim 3, wherein the body and the head are further connected by the heating oxygen channel and the fuel gas channel, and wherein the head is connected to a nozzle which comprises at least one heating mixer, the method further comprising mixing, via the at least one heating mixer, heating oxygen and fuel gas into a heating gas.

5. The method of claim 3, wherein the body and the head are further connected by a heating gas channel, the head is connected to a nozzle, and wherein the body comprises a heating mixer adapted for mixing heating oxygen and fuel gas into a heating gas and communicating the heating gas, downstream of the heating mixer, into the heating gas channel.

6. The method of claim 4, wherein the cutting process further comprises communicating automatically, via the ignition mixer, heating oxygen into the cutting oxygen channel downstream of the ignition mixer, and
wherein each of the cleaning and cooling process, and the cutting process further comprise automatically communicating, via fuel gas shut-off valve, fuel gas to the heating mixer.

7. The method of claim 5, further comprising measuring the pressure and/or the flow rate of the cutting oxygen in the cutting oxygen channel via a cutting oxygen sensor located in the cutting torch and/or the nozzle.

8. The method of claim 7, further comprising measuring the pressure and/or the flow rate of the cutting oxygen in the cutting oxygen channel via a cutting oxygen sensor located in the body.

9. The method of claim 1, further comprising adjusting, via a control system, a flow rate and/or a pressure of the heating oxygen, the cutting oxygen, and/or the fuel gas supplied to a body of the cutting torch.

10. The method of claim 7, further comprising adjusting, via a control system, a flow rate and/or a pressure of the heating oxygen, the cutting oxygen, and/or fuel gas supplied to a body of the cutting torch; and controlling, via the control system, the flow rate and/or the pressure of the cutting oxygen in the cutting oxygen channel based on the measurements from the cutting oxygen sensor.

11. The method of claim 10, wherein the head of the cutting torch comprises a temperature sensor.

12. The method of claim 11, further comprising changing, via the control system, the flow rate and/or the pressure of the heating oxygen, the cutting oxygen, and/or the fuel gas, depending on the temperature sensed by the temperature sensor.

13. The method of claim 11, further comprising controlling, via the control system, a mode of operation of the cutting torch; and changing, via the control system, the mode of operation from the ignition process to the cooling and cleaning process, based on the temperature sensed by the temperature sensor.

14. The method of claim 9, further comprising, via the control system, at least one of:

adjusting a flow rate and a pressure of the heating oxygen, the cutting oxygen, and/or the fuel gas, adjusting a proportion of the heating oxygen and the fuel gas in the ignition gas, alerting an operator of the cutting torch regarding unsafe or unusual conditions in the cutting torch, alerting an operator of the cutting torch regarding a need for maintenance of the cutting torch, performing maintenance of the cutting torch, performing nozzle exchange, or automatically stopping the gas flow and/or operation of the cutting torch.

15. The method of claim 9, wherein the body and a head of the cutting torch are connected by the cutting oxygen channel, and wherein the head comprises an ignition plug for igniting the ignition gas during the ignition process, wherein either the body and the head are further connected by the heating oxygen channel and the fuel gas channel, and wherein the head is connected to a nozzle which comprises at least one heating mixer adapted for mixing heating oxygen and fuel gas into a heating gas, or the body and the head are further connected by a heating gas channel, the head is connected to a nozzle, and wherein the body comprises a heating mixer adapted for mixing heating oxygen and fuel gas into a heating gas and communicating the heating gas, downstream of the heating mixer, into the heating gas channel, and wherein the nozzle comprises an electronic identifier, and wherein the control system is adapted for adjusting a flow rate and/or a pressure of the heating oxygen, the cutting oxygen, and/or the fuel gas, and/or adjusting a proportion of the heating oxygen and the fuel gas in the ignition gas based on a identifier of the electronic identifier.

16. The method of claim 15, wherein the identifier comprises data regarding at least one of: a size of the nozzle, sizes of the channels in the nozzle, a nozzle type and/or model, a fuel gas type, a type of gas mixing system, a nozzle manufacturing date, a batch number, an identification/serial number, or nozzle operation start-up time.

* * * * *